US006155500A

United States Patent [19]
Takase

[11] Patent Number: 6,155,500
[45] Date of Patent: Dec. 5, 2000

[54] PIEZOELECTRIC ACTUATOR AND FUEL-INJECTION APPARATUS USING THE ACTUATOR

[75] Inventor: Shigehisa Takase, Kanagawa, Japan

[73] Assignee: Isuzu Motors Limited, Tokyo, Japan

[21] Appl. No.: 09/340,163

[22] Filed: Jun. 28, 1999

[30] Foreign Application Priority Data

Jul. 1, 1998 [JP] Japan .................................. 10-186665

[51] Int. Cl.$^{7}$ .......................... F02M 39/00; F02M 41/00; F02M 43/00; F02M 47/00; F02M 55/00

[52] U.S. Cl. .................................... 239/533.3; 310/316.03

[58] Field of Search ............................... 310/316.03, 317; 239/102.2, 585.1, 533.3

[56] References Cited

U.S. PATENT DOCUMENTS

| | | | |
|---|---|---|---|
| 4,641,053 | 2/1987 | Takeda | 239/102.2 |
| 4,767,959 | 8/1988 | Sakakibara et al. | 310/317 |
| 5,803,361 | 9/1998 | Horiuchi et al. | 239/88 |

FOREIGN PATENT DOCUMENTS

| | | |
|---|---|---|
| 10-077924 | 3/1998 | Japan . |

*Primary Examiner*—Andres Kashnikow
*Assistant Examiner*—Davis Hwu
*Attorney, Agent, or Firm*—Browdy And Neimark

[57] ABSTRACT

A piezoelectric actuator is disclosed, wherein a superposing pulse is generated just after a command pulse falls to thereby reduce oscillations of displacement in piezoelectric elements. In the piezoelectric actuator, an exciting pulse having a preselected pulse width is applied across terminals of the piezoelectric elements to cause strains in dimension for the piezoelectric elements. A pulse is superposed such that it is superposed at a timing a at which the exciting pulse is turned on, and then the exciting pulse is once turned off for a minute length of time, or an interval between b and b', and turned on again at c. The pulse to be superposed is supplied with a timing less than one-fourth a period of an oscillation of the piezoelectric elements. The piezoelectric actuator is effective to prevent the resonance phenomenon and preferably employed for the fuel-injection apparatus.

8 Claims, 8 Drawing Sheets

F I G. 6
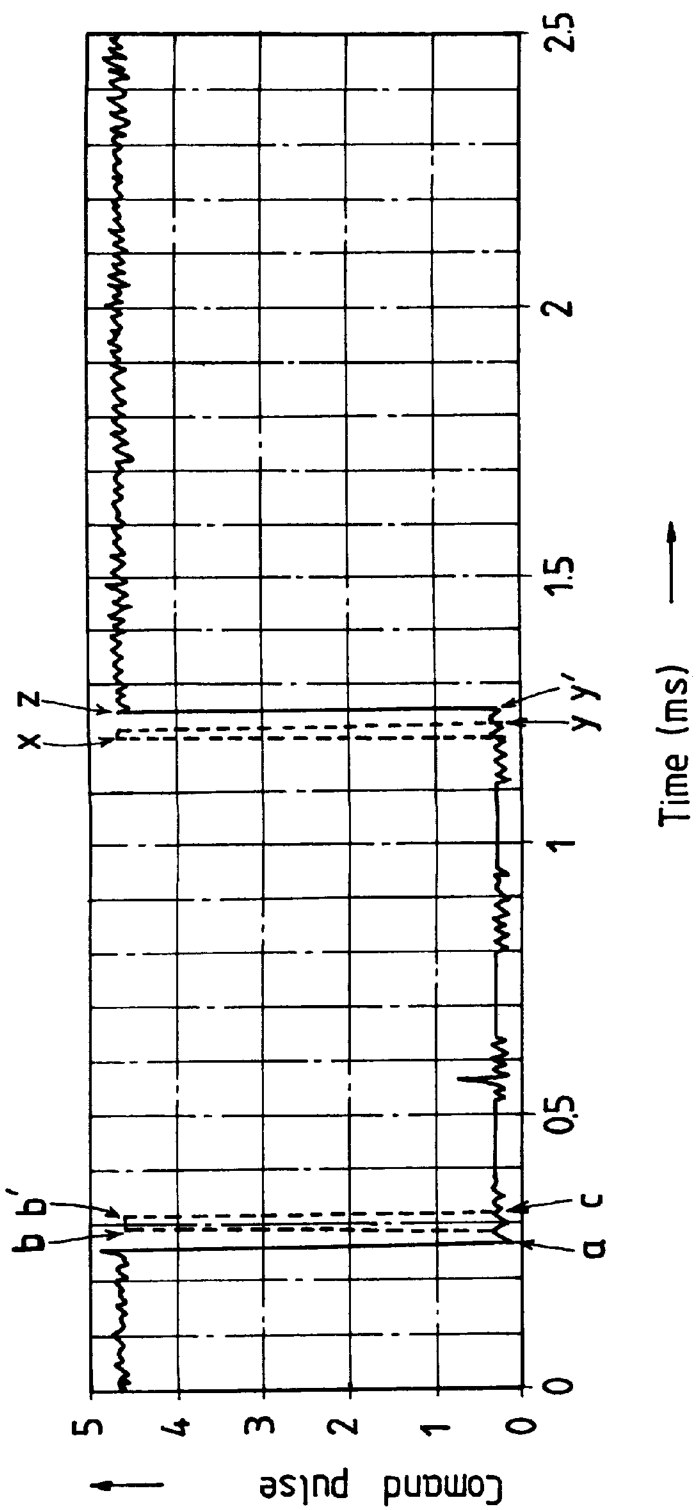

F I G. 7
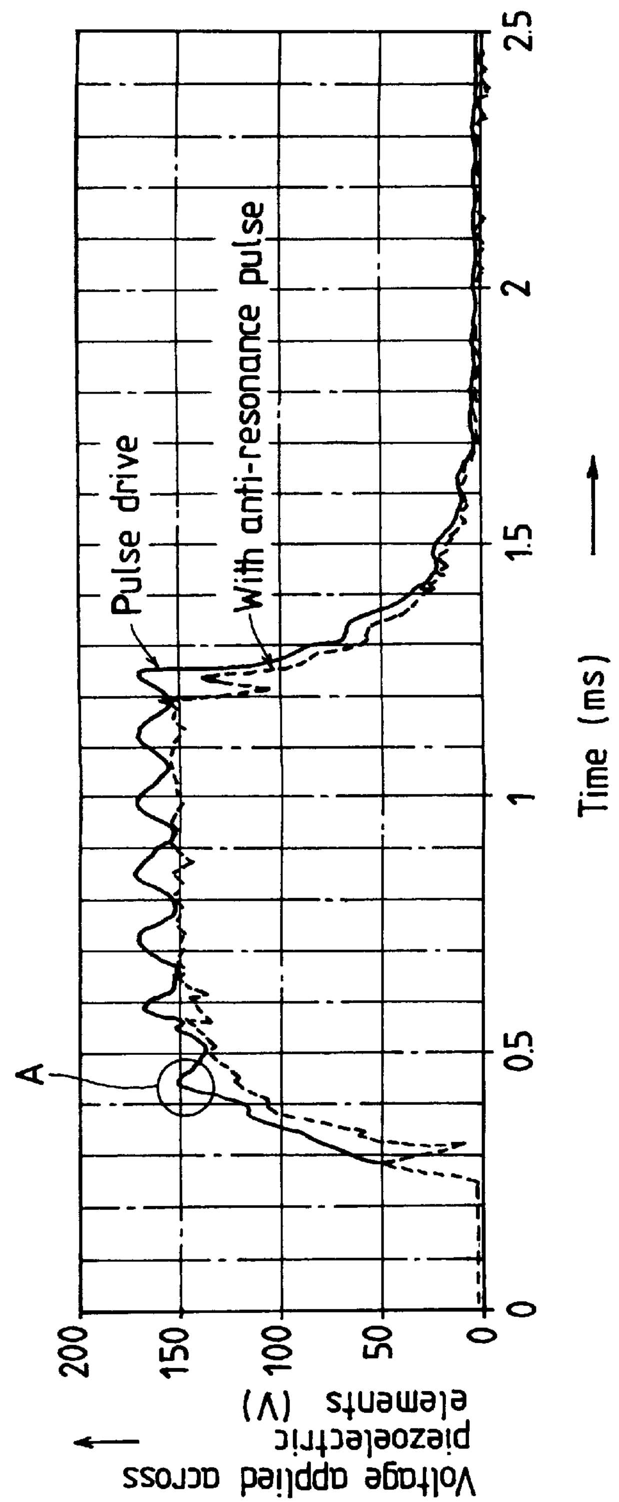

PIEZOELECTRIC ACTUATOR AND FUEL-INJECTION APPARATUS USING THE ACTUATOR

BACKGROUND OF THE INVENTION

1. Field of the Invention

The present invention relates to a piezoelectric actuator applicable to a fuel-injection apparatus of direct gasoline-injection engines, diesel engines or the like and having piezoelectric elements that, when applied with an electric current, may exhibit strains in dimension thereby driving an object. The present invention further relates to a fuel-injection apparatus provided with the same actuator.

2. Description of the Prior Art

Of the various fuel-injection apparatus that have been conventionally developed, for example, the pressure-accumulated, fuel-injection apparatus is widely used, in which fuel stored in the common rail under pressure is injected into the combustion chambers by the closure and open of the valves built in the injectors.

An exemplary pressure-accumulated, fuel-injection apparatus is disclosed in Japanese Patent Laid-Open No. 77924/1998, which is comprised of a body having fuel-discharge orifice, a needle valve movable in a space in the body in a reciprocating manner so as to open and close at its one axial end the fuel-discharge orifices, a balance chamber in which the needle valve is exposed at its axially opposite end serving as a pressure-supporting face to control the amount of lift of the needle valve, a fuel-supply passage for applying the fuel pressure to the balance chamber, a fuel-discharge passage for relief of the fuel pressure in the balance chamber, a valve for opening and closing the fuel-discharge passage, and a piezoelectric actuator for operating the valve. The actuator-operated valve is composed of a valve stem extending through the fuel-discharge passage into the balance chamber, and a tapered valve head provided at the end of the valve stem and having a valve face to make a contact with a valve seat formed at the ingress of the fuel-discharge passage.

The piezoelectric actuator may be driven with the command pulse width and the timing of "turned on", depending on the amount of fuel to be injected per cycle and the timing of fuel injection, which are defined in accordance with the engine operating conditions such as the engine rpm, engine load, accelerator position and the like. When the command pulse is made to fall for a duration during which the injectors are to be operated, the piezoelectric elements is applied with a preselected voltage for the duration, thereby kept in conductive phase. The electric current flowing through the piezoelectric elements causes the elements any strains in dimension to thereby vary the distance between the piezoelectric elements of laminated structure with the result of varying the total stroke of the laminated elements. This variation in total stroke comes into action on the valve stem of the actuator-operated valve, which is in turn moved along its axial direction.

The instant the piezoelectric actuator is energized, the valve face of the tapered valve head moves off its seat, whereby the actuator-operated valve opens the fuel-discharge passage, resulting in relieving the fuel pressure in the balance chamber to the fuel-discharge passage. Consequently, the fuel pressure acting on the pressure-support surface of the needle valve is reduced to allow the needle valve to lift so that the fuel may be injected out of the fuel-discharge orifices into the combustion chambers. In contrast, on deenergizing the piezoelectric actuator, the tapered valve head moves, together with the valve stem extending through the fuel-discharge passage into the balance chamber, towards the egress of the fuel-discharge passage and thus the valve face is pressed against the valve seat to block the fuel-discharge passage. At this event, the fuel pressure in the balance chamber increases so that the needle valve closes the fuel-discharge orifices to stop the fuel injection out of the discharge orifices in the injectors into the combustion chambers.

In the meantime, since the piezoelectric actuator is superior in responsive property of occurrence and disappearance of strains to the energization and deenergization thereof, the piezoelectric actuator for the valve control of the fuel-injection apparatus has the advantage of achieving the rapid operation of the start and stop of the fuel injection with less response lag even the fuel injection cycle is very short in period in compliance with the high-speed rotation of the engines.

In the prior piezoelectric actuators, nevertheless, the instant the command pulse starts to fall or the injector is turned on, the piezoelectric elements are suddenly excited under an electric voltage that increases steeply. For the reason above, the prior actuator has trended to be driven over its design stroke at the initial timing of its driving, which might cause the piezoelectric actuator itself to oscillate, thereby obstructing the actuator from consistency with the desired stroke. The over stroke is a major cause of the damage in the actuator.

The problems in the prior piezoelectric actuator as described above will be explained with reference to FIGS. 6 to 8.

Now assuming that an exciting pulse is applied to raise up a command pulse after a lapse of 1 ms from a timing at which the command pulse falls as shown with a solid line in FIG. 6, the voltage applied across the piezoelectric elements, as shown with a solid line in FIG. 7, causes an overshoot, refer to a circle A, just after the command pulse has started to fall, and thereafter starts to oscillate with a resonance amplitude of about 20V. As apparent from the above, the exciting pulse in the prior art causes a resonance frequency in the voltage applied across the piezoelectric elements, which is defined by a design constant of the piezoelectric elements. Moreover, as shown with a solid line in FIG. 8, an overshoot, refer to a circle B, happens in a dimensional strain or displacement in the piezoelectric elements and also a mechanical oscillation having a resonance amplitude of about 30 $\mu$m, or a ringing, occurs in the piezoelectric elements. On exciting the piezoelectric elements, as explained above, the resonance takes place owing to the ringing. Thus, the resonance in the piezoelectric elements becomes obstructive to the desired displacement and causes the dielectric breakdown across the terminals of the piezoelectric elements. Moreover, the displacement in the piezoelectric elements does not damp immediately, but continues to oscillate even after the command pulse has raised up, or the exciting pulse is turned off.

Consequently, the prior piezoelectric actuator has for its technical subject to eliminate the overshoot in the voltage across the piezoelectric elements and in the displacement in the piezoelectric elements, and to prevent the ringing thereby preventing the occurrence of resonance phenomenon.

SUMMARY OF THE INVENTION

The present invention is to overcome the above shortcomings to be solved, and to provide a piezoelectric actuator in which a superposing pulse is generated just after a command pulse has started to fall to make an overshoot less whereby a displacement in piezoelectric elements is reduced, and also to provide a fuel-injection apparatus incorporated with the same piezoelectric actuator.

The present invention relates to a piezoelectric actuator in which an electric potential is applied across terminals of piezoelectric elements by turning on an exciting pulse to cause strains in dimension for the piezoelectric elements, the resultant strains are held for a preselected length of time, and thereafter the application of the electric potential ceases by turning off the exciting pulse whereby the piezoelectric elements are released from the strains in dimension, wherein, just after the exciting pulse is turned on, a pulse is superposed so as to turn off for a minute length of time.

In the piezoelectric actuator of the present invention, a pulse is superposed in synchronized with a timing at which the exciting pulse is turned on. In other words, the pulse is superposed in such a manner as to once turn off the exciting pulse in synchronized with the timing at which the exciting pulse is turned on, and again turn on the exciting pulse after a lapse of a minute length of time. This lessens the voltage across the piezoelectric elements and the overshoot of the displacement in the piezoelectric elements while reduces the oscillations thereof.

the piezoelectric actuator of this invention, moreover, in order to prevent the dielectric breakdown across the terminals of the piezoelectric elements, it is preferred that, just before the exciting pulse is turned off, an exciting pulse is also superposed for a minute length of time so as to once turn off the exciting pulse.

In another aspect of the present invention, the piezoelectric actuator is preferred, wherein the pulse superposed for the minute length of time is controlled so as to turn off with a timing less than one-fourth a period of an oscillation obtained as a characteristic and also turn on with the same timing. That is to say, the exciting pulse is preferably turned off within a minute period less than one-fourth a period of an oscillation, just after the exciting pulse has been turned off, and also turned on again after a lapse of the same period. The provision of the minute period has the great effect on diminishing the overshoot, which might otherwise happen at the initiation of displacement in the piezoelectric actuator, as well as reducing the oscillations in the displacement.

The present invention is also concerned with a fuel-injection apparatus comprising; a body having discharge orifices to inject fuel, a needle valve movable in a reciprocating manner in a space in the body to thereby open and close at one end thereof the discharge orifices, a balance chamber in which the needle valve is exposed at its opposite end providing a pressure-exposed surface to bear a fuel pressure to regulate an amount of lift of the needle valve, a fuel path for supplying the fuel pressure into the balance chamber, a fuel-discharge passage for releasing the fuel pressure in the balance chamber, a valve for opening and closing the fuel-discharge passage, and an actuator for operating the valve, the actuator being of a piezoelectric actuator.

The piezoelectric actuator of the present invention is controlled such that the exciting pulse is turned on at the start of the fuel injection and turned off at the end of the fuel injection. The piezoelectric actuator is superior in responsive characteristics of the occurrence and extinction of strains with respect to the switching-on and off of the electric potential and, therefore, able to start and cease injecting fuel without time lag on even the fuel-injection cycle that is very high in frequency for the high-speed engines. Further, a pulse is superposed so as to once turn off the exciting pulse, immediately after the start of fuel injection, in synchronized with a timing at which the exciting pulse is turned on, and turn on again the exciting pulse after a lapse of a minute length of time. As a result, the piezoelectric actuator may be effectively protected from the dielectric breakdown. In addition, it is preferable to superpose, just before the end of the fuel injection or just before the exciting pulse is turned off, an exciting pulse to turn off the exciting pulse for a minute length of time.

In the piezoelectric actuator of this invention constructed as described above, an exciting pulse is superposed so as to turn off the exciting pulse, just after having been turned on, for a minute length of time. This lessens the resonance amplitude at the timing of turning on the exciting pulse, which might be 20V in voltage and 30 $\mu$m in displacement, thus resulting in improving the accuracy of defining the desired displacement.

The fuel-injection apparatus having mounted with the piezoelectric actuator described above may be reduced in resonance oscillations with the result of improvement on the accuracy of the displacement in the actuator, and also protected against the dielectric breakdown across the terminals of the piezoelectric elements, thereby providing a very reliable and long-life fuel injectors. The fuel-injection apparatus of the present invention may operate rapidly so as to start and cease injecting fuel without time lag on even fuel-injection cycle very high in frequency.

Moreover, in the fuel-injection apparatus of this invention, the operating modes of the actuator-operated valve may be altered by regulating the timing, interval, strength and the like of the electric current applied to the piezoelectric elements, thereby varying the speed on lift of the needle valve depending on the engine operating conditions. This makes it possible to achieve reliably various characteristics on fuel-injection rating, especially, initial characteristics on fuel-injection rating, thereby diminishing the NOx emissions and noise from the engines. In the fuel-injection apparatus of this invention, further, the higher the fuel pressure in the balance chamber is, the greater is the force closing the actuator-operated valve, which may thus block certainly the fuel leakage flowing out through the valve. This relieves the fuel injection pump from useless working load, thereby improving specific fuel consumption of engines.

DESCRIPTION OF THE DRAWING

FIG. 6 is a graphic representation of an exemplary command pulse to control a piezoelectric actuator:

FIG. 7 is a graphic representation showing a variation in a voltage across the piezoelectric elements controlled with the command pulse.

DETAILED DESCRIPTION OF THE PREFERRED EMBODIMENTS

Referring now in detail to the drawings, a preferred embodiment of the fuel-injection apparatus according to the present invention will be explained below.

Figure 8:
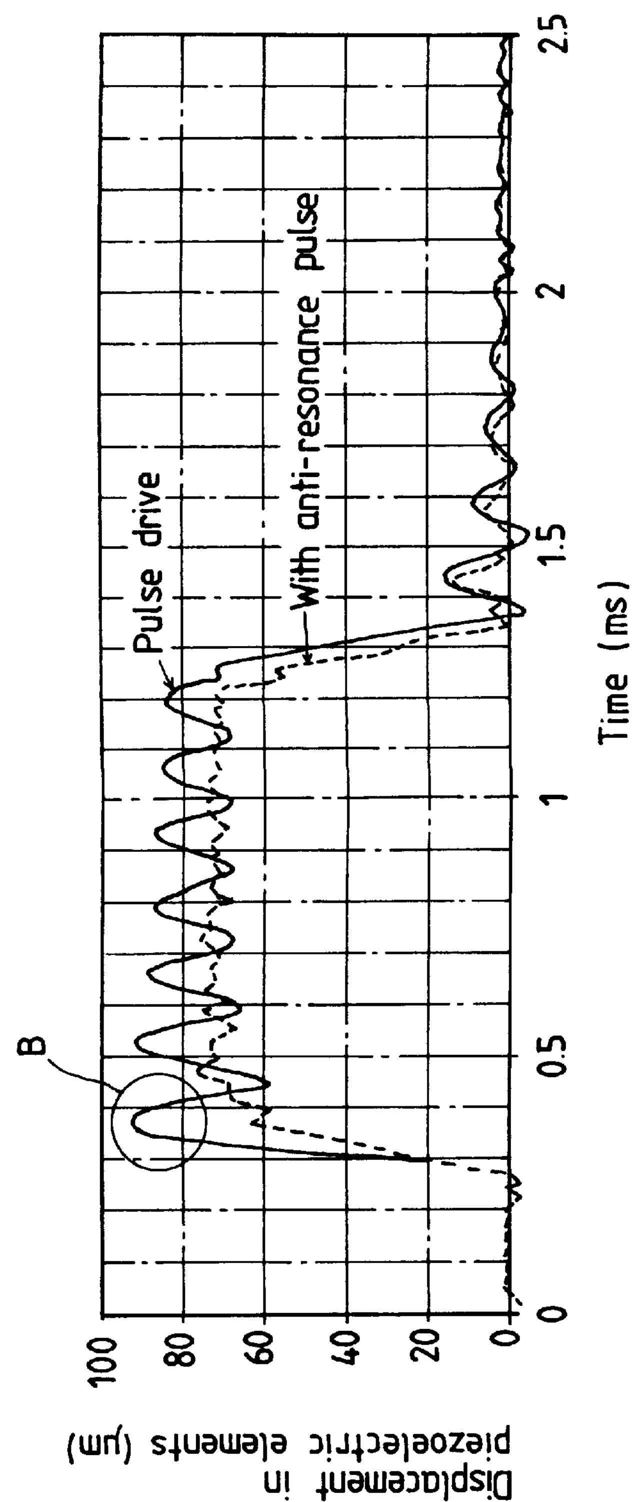
FIG. 8 is a graphic representation showing a variation in a displacement of the piezoelectric elements controlled with the command pulse.

First, FIG. 6 illustrates a waveform of an exciting pulse to control a piezoelectric actuator. Now considering that the exciting pulse shown with a solid line is applied to piezoelectric elements, such that after having held for 1 ms the event a command pulse had fallen or the exciting pulse had turned on, the command pulse is raised up or the exciting pulse is turned off. In the phase as described above, a voltage across the piezoelectric elements varies along a solid line in FIG. 7 while a displacement in the piezoelectric elements varies as shown in FIG. 8. The voltage across the piezoelectric elements starts to steeply arise just after the command pulse has fallen, causing an overshoot at an area circled at A in FIG.7, and thereafter continues to oscillate. Subsequently, just after the command pulse has risen, the voltage suddenly starts to reduce and approaches gradually zero. The displacement in the piezoelectric elements also starts to steeply arise just after the command pulse has fallen, causing an overshoot at an area circled at B in FIG.8, and thereafter continues to oscillate. Then, just after the command pulse has risen, the displacement rapidly reduces and attenuates with oscillation for a short while. The oscillation happens with a period of somewhat larger than 0.1 ms, either voltage or displacement.

As apparent from FIG. 6, the command pulse is superposed with the exciting pulse that is turned on and immediately thereafter turned off for a minute length of time. That is, the exciting pulse is once turned off synchronized with the "turn-on" timing of the exciting pulse and turned on again after a lapse of a minute time, which is a period less than one-fourth the period of the oscillation given as a characteristic of the piezoelectric actuator.

In practice, just after the command pulse has fallen at a timing a in FIG. 6, the command pulse is once raised up, at a timing b in FIG. 6, within a length of time less than one-fourth the period of the oscillation of the piezoelectric actuator. After a further minute length of time equal to the length of time between the timings a and b, the command pulse falls at a timing c in FIG. 6 and held at the last event, or the event the exciting pulse is turned on, for a little 1 ms. As a result of the control of the command pulse as described just above, the voltage across the piezoelectric elements may vary along a broken line in FIG. 7 while the displacement in the piezoelectric elements may vary as shown with a broken line in FIG. 8.

Superposing the exciting pulse on the command pulse, as shown in FIG. 7, results in preventing the occurrence of the overshoot that might otherwise happen in the voltage across the piezoelectric elements. That is, the broken line in FIG. 7 may vary more smoothly with no area circled at A. Also on the displacement in the piezoelectric elements, no overshoot occurs as shown in FIG. 8, or the area circled at B is not observed on the broken line of FIG. 8. It will be thus understood from the broken lines in FIGS. 7 and 8 that during about 1 ms at which the command pulse is held at fall phase or the exciting pulse is held turned on, the oscillations in the voltage and displacement in the piezoelectric elements are made reduced so that little overshoot occurs.

On the control operation in FIG.6, also in the event in which the command pulse fell at the timing a in FIG. 6 rises again at a timing z in FIG. 6 after a lapse of 1 ms, the exciting pulse is superposed on the command pulse, just before turning on the command pulse, so as to turn off once and turn on again the command pulse after a lapse of a minute length of time. That is to say, immediately before the rise of command pulse, the command pulse once rise at a timing x in FIG. 6, then falls at a timing y after a minute length of time less than one-fourth the period of the oscillation of the piezoelectric actuator. After a further minute length of time equal to the length of time between the timings x and y, the command pulse rises again at the timing z in FIG. 6. This control operation has a great effect on the dielectric breakdown across the terminals of the piezoelectric elements.

The following explains embodiments of a fuel-injection apparatus provided with the piezoelectric actuator of the present invention.

Figure 1:
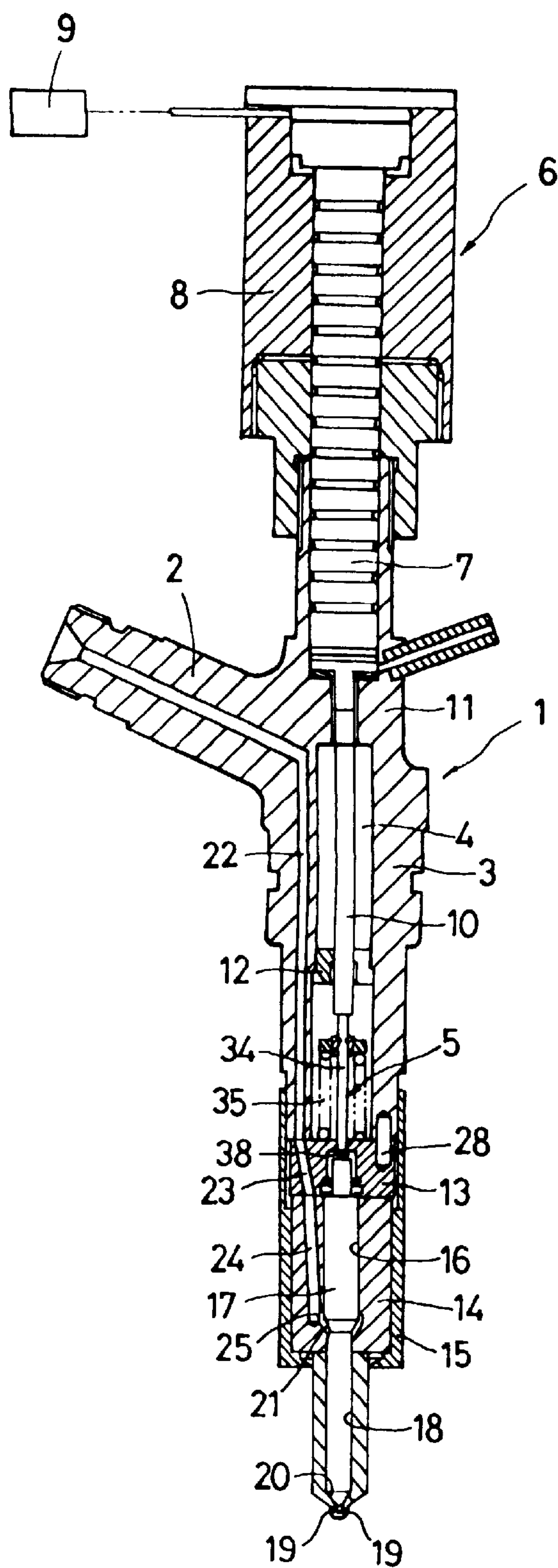
FIG. 1 is an axial sectional view showing a preferred embodiment of a fuel-injection apparatus according to the present invention.

This fuel-injection apparatus is suitably applicable to the common rail, fuel-injection system or pressure-accumulated, fuel-injection apparatus, not shown in the drawing. The fuel fed in an accumulator, referred to as "common rail" hereinafter, by a fuel injection pump is intensified in pressure in the common rail to the high pressure fuel, which is in turn charged out of injection nozzles of the fuel-injection apparatus into combustion chambers. First referring to FIG. 1, an injector body 1 of the fuel-injection apparatus is hermetically attached in a bore, not shown in figures, provided in a base such as a cylinder head through a sealing member. The injector body 1 is hermetically mounted at the lower end thereof with a nozzle.

The injector body 1 is formed at the upper shoulder thereof with a high-pressure fuel inlet 2. The injector 1 includes a middle section 3 provided therein with a space 4 extending axially of the injector body 1. Arranged in the space 4 is a valve 5 for opening and closing a fuel-discharge passage 33, which will be described below. The valve 5 is designed to be driven by a piezoelectric actuator 6, which is composed of piezoelectric elements 7 laminated one on the other and accommodated in the injector body 1 with a fixing cap 8 screwed on the middle section 3. The piezoelectric elements 7 operate in response to control signals issued from a control unit 9 to drive the valve towards its open position. An output shaft 10 of the piezoelectric actuator 6 is extended from the piezoelectric elements 7 through the space 4 and further guided for sliding movement through a guide section 11 reduced radially with respect to the space 4 in the middle section 3, and a guide piece 12 arranged in the space 4 near the nozzle tip with respect to the guide section 11. The output shaft 10 may make a high-speed axial reciprocating movement under the operation of the piezoelectric elements 7 in the actuator 6.

The piezoelectric actuator 6 is the same as described above in connection with FIGS. 6 to 8.

The piezoelectric elements 7 in the actuator 6 are applied with an exciting pulse having a command pulse width corresponding to an operating duration of the injector. A command pulse width spanning from a pulse fall to a pulse rise is equal to the duration during which the injector is operated. Once the command pulse starts to fall, consequently, the command pulse is kept at its pulse-fall phase for the duration of the injector operation, only during which a preselected exciting voltage is applied across the laminated piezoelectric elements 7 and thus an electric current flows through the piezoelectric elements 7, which are in turn caused to vary in distance between any adjoining elements to thereby produce a desired amount of variation in the total stroke. The variation in the total stroke makes the output shaft 10 force along its axial direction.

In this way, the control described above with reference to FIGS. 6 to 8, ought to be executed, wherein just after the command pulse has fallen, or the injector has started to operate, the command pulse is once raised up for the minute length of time, and immediately after a further minute length of time, falls again. Moreover, it is of course preferred to add another control in which, immediately before the rise of command pulse, or just before the injector ceases to operate, the command pulse once rise for a minute length of time, and then falls at once. Superposing the exciting pulse on the command pulse just after the pulse fall is advantageous for suppressing the oscillations occurring in the piezoelectric actuator. This makes it possible to control accurately the displacement of the actuator, resulting in improving the precision on the definition. In contrast, the superposition of the exciting pulse just before the pulse rise of the command pulse has little relation with the accurate control on the amount of the displacement of the piezoelectric actuator, but has the effect on the protection against the dielectric breakdown across the piezoelectric elements.

The control member 13 is arranged interposed between the middle section 3 and a nozzle body 14. Both the control member 13 and the nozzle body 14 are united together to the middle section 3 to constitute a part of the injector body 1 by screwing a threaded cap 15, engaged with the nozzle body 14, onto the mating portion of the middle section 3. The nozzle body 14 is provided therein with a nozzle bore 16 in which a needle valve 17 is inserted for sliding movement so as to provide an annular clearance 18 therebetween. The clearance around the needle valve 17 forms a high-pressure fuel passage. The nozzle body 14 is formed at its tip with a discharge orifice 19 through which the fuel is injected into the combustion chambers of the internal combustion engine. The needle valve 17 has a tapered end. Axial reciprocating motion of the needle valve 17 causes the its tapered end to raise off and to reseat on a confronting tapered surface 20 at the tip of the nozzle bore 16 in the nozzle body 14, whereby the fuel flow to be injected out of the discharge orifice 19 may be allowed and blocked. The needle valve 17 has at the midway area thereof an annular tapered surface 21 that forms a pressure-exposed surface for bearing the fuel pressure acting in the direction where the needle valve 17 opens the discharge orifice. The instant the needle valve 17 is raised off the tapered surface 20, the high-pressure fuel may be injected out of the discharge orifice 19 into the combustion chamber. In contrast, when the needle valve 17 moves back down onto the tapered surface 20, the fuel flow is blocked and thus the fuel injection ceases.

The fuel fed from the common rail, not shown, for the high-pressure supply source to the fuel inlet 2 flows through a fuel passage 22 in the injector body 1, a fuel passage 23 in the control member 13 and a fuel passage 24 in the nozzle body 14, and reaches the fuel sac 25 to which is exposed the tapered surface 21 for the pressure-exposed surface. The instant the needle valve 17 opens the discharge orifice 19, the fuel in the sac 25 may be injected out of the discharge orifice 19.

Figure 2:
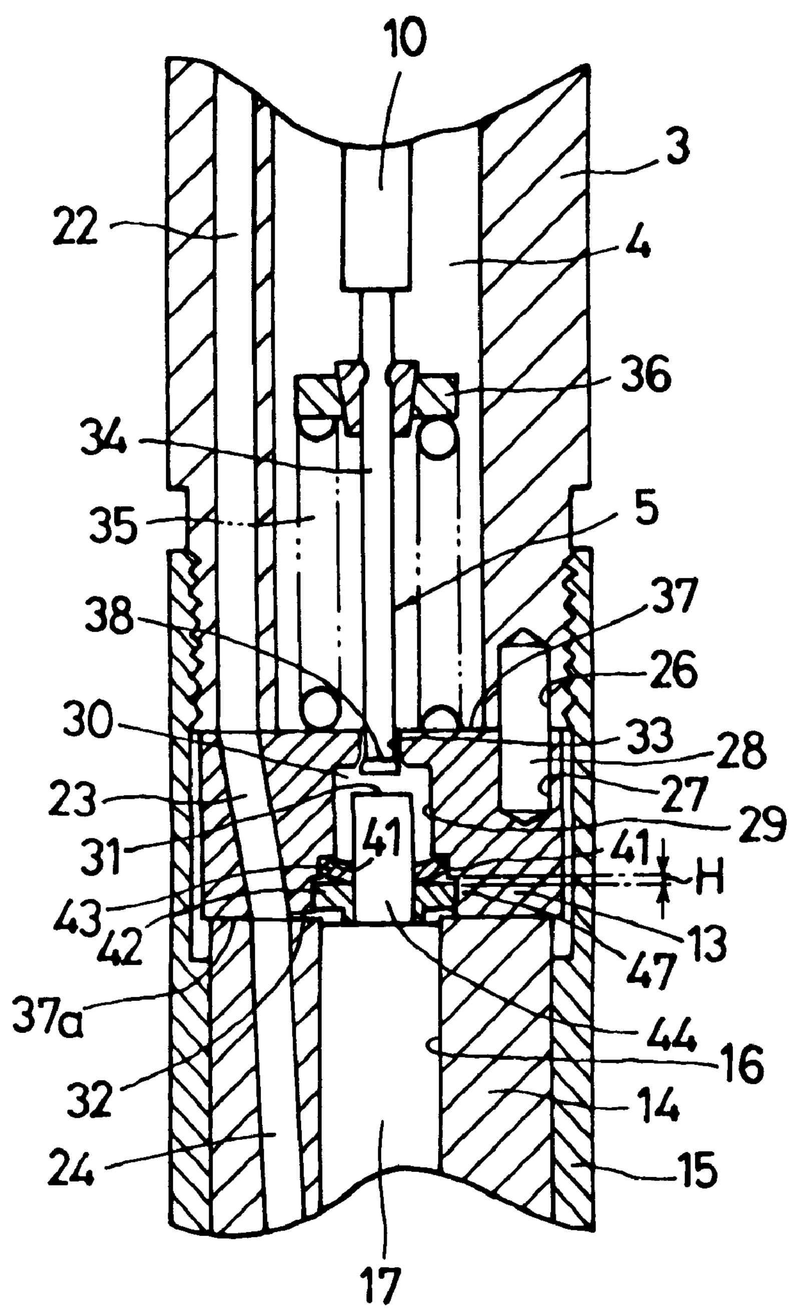
FIG. 2 is a fragmentary enlarged axial sectional view showing the essential parts of the fuel-injection apparatus in FIG. 1.

As shown in detail in FIG. 2, the control member 13 has a hole 27 that is at the position offset radially outwardly with respect to the center thereof and in alignment with a hole 26 in the injector body 1. A connector pin 28 is inserted in the confronting holes 26, 27 to thereby keep the control member 13 in proper position relatively of the middle section 3. The control member 13 is further provided with a recess 29 opened facing to the nozzle body 14. The needle valve 17, explained in detail hereinafter, extends into the recess 29 and has at its end a pressure-exposed surface 31 to the fuel pressure, which cooperates with the recess 29 to define the balance chamber 30. The control member 13 is bored with a fuel path 32, which is open to the fuel passage 23 and extends radially to the center of the control member 13. The fuel path 32 communicates with the balance chamber 30 to feed the high-pressure fuel into the chamber 30. The fuel-discharge passage 33 is bored axially at the center of the control member 13 so as to communicate at one end thereof with the balance chamber 30 and at the opposite end with the axially extending space 4 in the middle section 3.

The actuator-operated valve 5 includes a valve stem 34 connected integrally with the output shaft 10 of the piezoelectric actuator 6, and a return spring 35 to urge the valve stem 34 in a direction for closing the valve 5. The return spring 35 is abutted at its one end against a spring bearing 36 fixed to the valve stem 34 and at the opposite end against a top face 37 of the control member 13. The return spring 35 is fitted under compression to urge constantly the valve stem 34 upwards.

Figure 4:
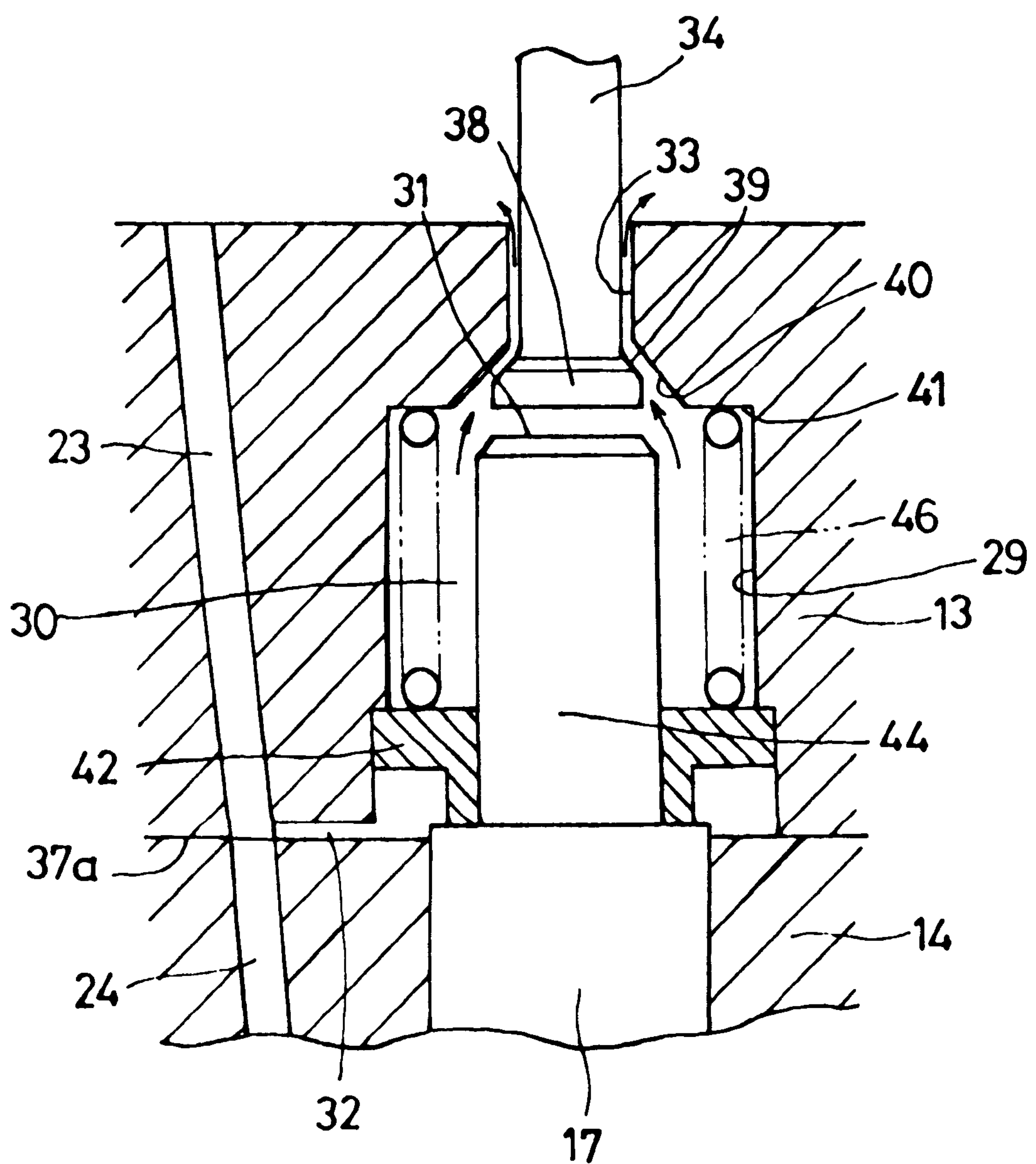
FIG. 4 is a fragmentary enlarged explanatory view of an actuator-operated valve in its open position in the fuel-injection apparatus shown in FIG. 3.

The valve stem 34 extends through the fuel-discharge passage 33, leaving a small clearance therebetween, into the b balance chamber 30. The valve stem 34 has at its end a tapered valve head 38 to open and close the fuel-discharge passage 33. The essential structures or components of the fuel-injection apparatus in FIG. 4 is substantially identical with that of the fuel-injection apparatus in FIG. 2, except for the type of the spring serving as means for biasing the needle valve 17 towards its closing position at which the fuel injection ceases, and therefore the details of the actuator-operated valve 5 will be explained below in connection with FIG. 4.

The tapered valve he ad 38 has a tape red conical valve face 39 that may snugly match a valve seat 40 of a conical convex surface, which is formed in the fuel-discharge passage 33 at its end opened facing to the balance chamber 30. When the piezoelectric actuator 6 is in nonconductive state or deenergized, the actuator-operated valve 5 is held by the spring force of the return spring 35 at its closure position where the valve face 38 of the tapered valve head 39 seats against the valve seat 40 in face-to-face contact relation, thereby blocking the fuel-discharge passage 33. With the piezoelectric actuator 6 turned into energization by the application of electric current, the valve stem 34 of the valve 5 moves downwards in the drawing, overcoming the spring force of the return spring 35. This forces the valve face 39 of the tapered valve head 38 off the valve seat 40 to open the fuel-discharge passage 33 at its one open end facing the balance chamber 30, thereby allowing a little flow of fuel indicated with arrows, so that the fuel pressure in the balance chamber 30 is relieved to the space 4 through the clearance between the confronting fuel-discharge passage 33 and the valve stem 34.

A diaphragm spring 43 for return spring is interposed under compression between a corner 41 of the recess 29 and a spring bearing 42 attached to the axial end 44 of the needle valve 17. The diaphragm spring 43 forces the needle valve 17 to its closure position where the needle valve 17 blocks the fuel flow to the discharge orifice 19. Both the spring bearing 42 and the diaphragm spring 43 are formed with suitable holes, not shown, to allow the fuel pressure in the fuel path 32 to reach the balance chamber 30. The force of the fuel pressure in the balance chamber 30 acting on the pressure-exposed surface 31 of the needle valve 17 may control the lift of the valve head under balance with the fuel pressure exerted on the pressure-exposed surface of the tapered surface 21 of the needle valve 17 and the return force of the diaphragm spring 43 acting on the needle valve 17. The control member 13 is provided with a shoulder 47 for accommodate the spring bearing 42. The shoulder 47 is formed larger in depth by a distance H, compared to the thickness of the spring bearing 42. The distance H is equal to a distance spanning from the closure position to the open position of the needle valve 17, which may be thus movable within the range of between the closure and open positions.

Since the effective open area provided by moving the valve face 39 of the tapered valve head 38 off the valve seat 40 is designed less than the cross-sectional area of the clearance between the fuel-discharge passage 33 and the valve stem 34 over almost all operating range of the valve 5, the open degree of the actuator-operated valve 5 upon opening the fuel-discharge passage 33 defines the extent of reduction of the fuel pressure in the balance chamber 30.

The following explains as to the operation of the embodiment constructed as described just above. With the piezoelectric actuator 6 being deenergized, the return spring 35, as shown in FIG. 2, forces the valve stem 34 through the spring bearing 36 upwards in the drawings, whereby the valve face 39 of the tapered valve head 38 seats against the valve seat 40 so that the actuator-operated valve 5 shuts off the fuel-discharge passage 33. In this event, the high-pressure fuel fed from the common rail is supplied from the high-pressure fuel inlet 2 to the fuel sac 25 through the fuel passages 22, 23 and 24. The fuel in the sac 25 acts on the tapered surface 21 of the needle valve 17, which is thus urged towards the direction of lift. The fuel also reaches the clearance 18 defined between the nozzle body 14 and the periphery of the needle valve 17 thereby to fill the clearance 18. Moreover, the fuel pressure, which is charged in the balance chamber 30 through the fuel path 32, acts on the pressure-exposed surface 31 of the needle valve 17. Under this phase, the resultant force of the return force of the diaphragm spring 43 with the force of the fuel pressure acting the pressure-exposed surface 31 to force the needle valve 17 to its closing position exceeds the force of the fuel pressure acting on the pressure-exposed surface of the tapered surface 21 to force the needle vale 17 to its open position and, therefore, the needle valve 17 closes the discharge orifice 19 whereby the fuel injection ceases.

The instant a controller unit 9 energizes the piezoelectric actuator 6, the valve stem 34 is forced downwards in the drawing against the compression spring force of the return spring 35 to move the valve face 39 of the tapered valve head 38 off the valve seat 40 whereby the valve 5 opens the fuel-discharge passage 33. The fuel path 32 has the effect of an iris, which renders the flow of fuel in the fuel path 32 smaller than that in the fuel-discharge passage 33. Therefore, opening the fuel-discharge passage 33 relives the fuel pressure in the balance chamber 30 to the space 4. Upon relief of the fuel pressure in the balance chamber 30, the force of the fuel pressure acting on the tapered surface 21 to force the needle valve 17 to its open position overcomes the resultant force of the return force of the diaphragm spring 43 with the force of the fuel pressure acting the pressure-exposed surface 31 to force the needle valve 17 to its closing position to thereby lift the needle vale 17 so that the fuel is injected out of the discharge orifice 19 into the combustion chambers. As the effective open area of the fuel-discharge passage 33 opened by the actuator-operated valve 5 is designed less than the cross-sectional area of any other fuel-discharge passages after the balance chamber 30, the open degree of the actuator-operated valve 5 defines the magnitude of the fuel pressure in the balance chamber 30.

The instant the control unit 9 ceases the supply of electric current to the piezoelectric actuator 6, the return spring raises the valve stem 34 to close the actuator-operated valve 5. The balance chamber 30 is applied the fuel pressure from the fuel path 32 thereby restoring the fuel pressure therein and, consequently, the needle valve 17 stops the fuel injection. The restored fuel pressure acts on the tapered valve head 38 to consequently urge, in addition to the force of the return spring 35, the valve face 39 against the its seat 40. It will be understood that the higher the fuel pressure in the balance chamber 30 is, the greater is the force closing the actuator-operated valve 5, which may thus block certainly the fuel leakage.

Figure 3:
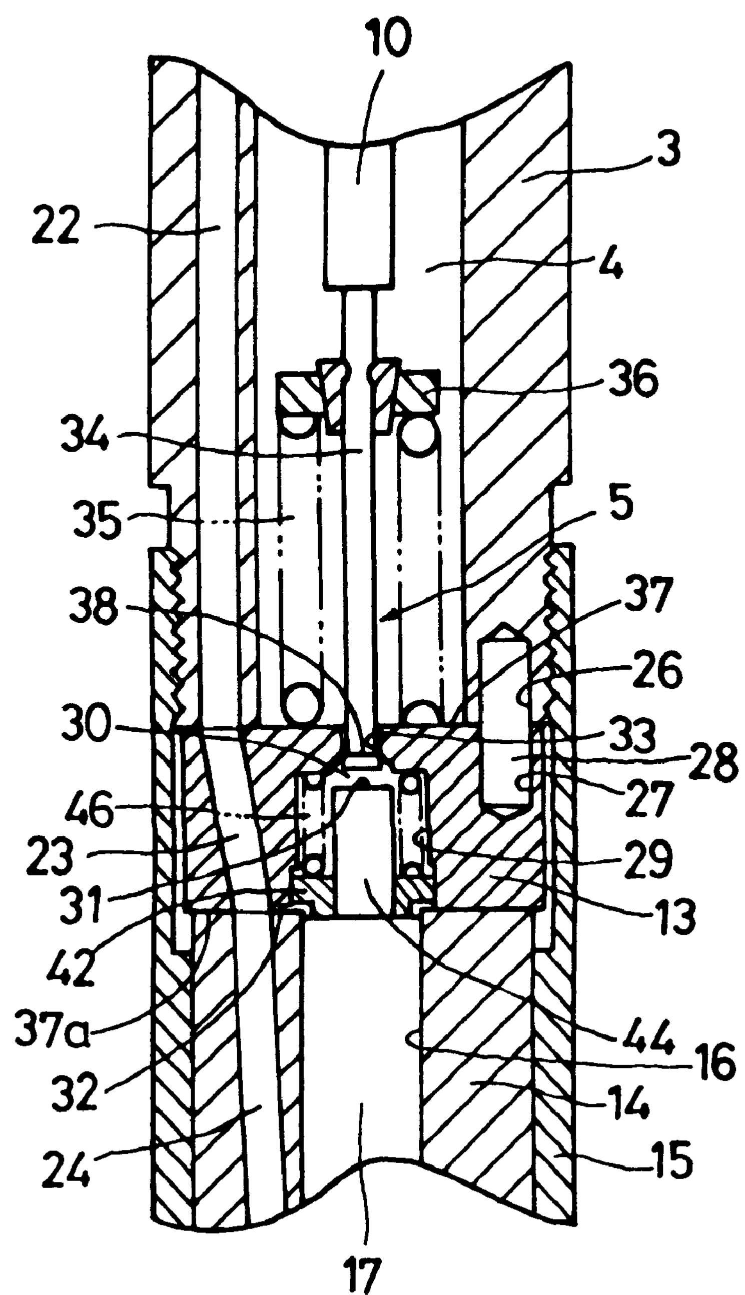
FIG. 3 is a fragmentary enlarged axial sectional view showing another embodiment of the fuel-injection apparatus according to the present invention.

In another embodiment shown in FIGS. 3 and 4, instead of the diaphragm spring, a coiled spring 46 is used for the return spring to force the valve 5 toward the closure position. Like numerals designate identical or corresponding components or parts throughout FIGS. 2 and 3 and, therefore, the previous description is applicable.

The coiled spring 46 in the embodiment shown in FIG. 3 is contained in the balance chamber 30 with its one end being abutted against the spring bearing 42 and the opposite end being a bottom face of the recess 29. The coiled spring 46 has no difference in the function of return spring from the diaphragm spring 43. The coiled spring 46 may use without any modification the bottom face of the recess 29 for the spring bearing surface and, therefore, has the advantage of not having to form the corner 41 in the recess 29, which is required for the diaphragm spring 43.

Figure 5:
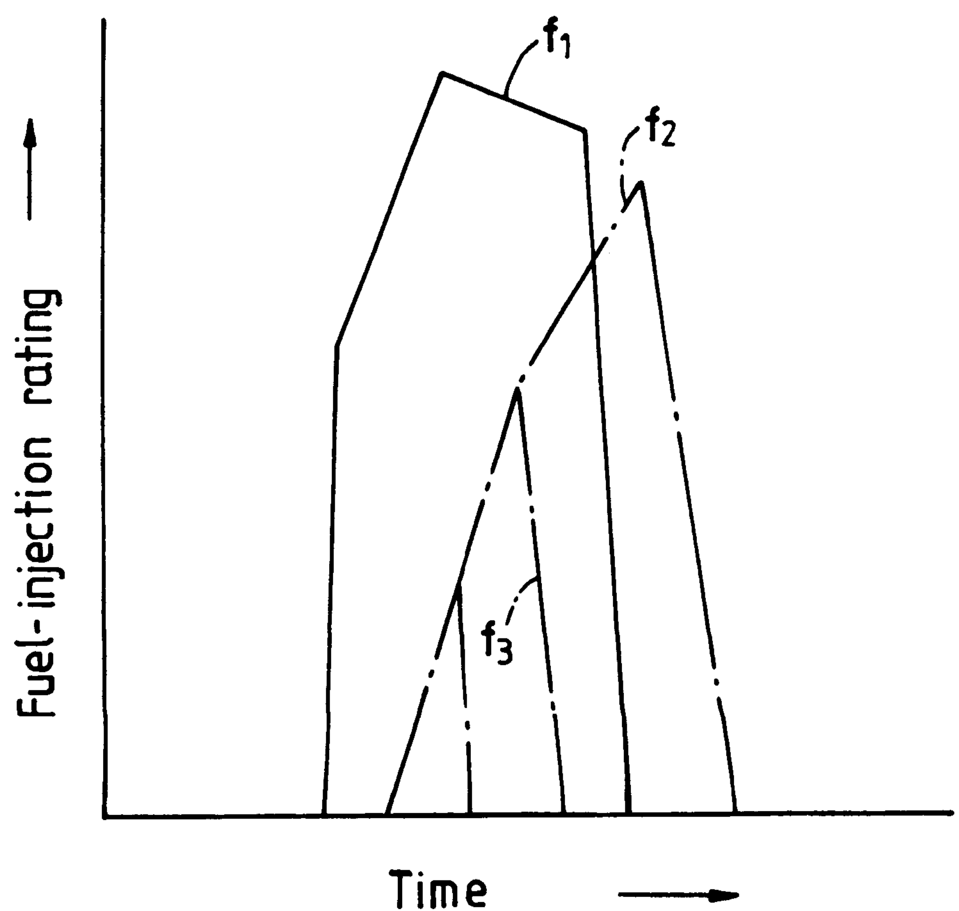
FIG. 5 is a graphic representation showing a lift of a needle valve during a fuel-injection cycle.

FIG. 5 illustrates fuel-injection ratings per one fuel-injection cycle, which are obtained by a conventional instrument for measuring the fuel-injection rating. A curve fl shows the fuel-injection rating of the needle valve 17 in a fuel-injection cycle in which the piezoelectric elements 7 in the piezoelectric actuator 6 are applied with a high voltage. It will be found that, as the electricity is supplied, the fuel-injection rating increases steeply. In contrast, when applying a low voltage to the piezoelectric elements 7, the fuel-injection rating increases slowly, as shown with a curve f2, as the electricity is supplied. Moreover, as shown especially in connection with the curve f2, if the application of electricity to the piezoelectric elements 7 ceases within a relatively short length of time, the fuel injection may be stopped at low fuel-injection rating, as shown in a curve f3. Namely, the fuel-injection rating may be easily controlled by regulating the timing, interval, strength and the like of the electricity applied to the piezoelectric elements 7, depending on the engine operating conditions such as engine load.

It should be understood that the foregoing relates to only preferred embodiments of the present invention, and that is intended to cover all changes and modifications of the examples of the invention herein chosen for the purposes of the disclosure, which do not constitute departure from the spirit and scope of the invention.

What is claimed is:

1. In a piezoelectric actuator in which an electric potential is applied across terminals of piezoelectric elements by turning on an exciting pulse to cause strains in dimension for the piezoelectric elements, the resultant strains being held for a preselected length of time, and thereafter the application of the electric potential ceases by turning off the exciting pulse whereby the piezoelectric elements are released from the strains in dimension, the improvement wherein, just after the exciting pulse is turned on, a pulse is superposed so as to turn off for a minute length of time during which the piezoelectric elements remain substantially strained in dimension.

2. The improvement as defined in claim 1, wherein a pulse is superposed for a minute length of time during which the piezoelectric elements remain substantially strained in dimension so as to turn off the exciting pulse immediately before the exciting pulse is turned off.

3. The improvement as defined in claim 1, wherein the pulse superposed for the minute length of time is controlled so as to turn off with a timing less than one-fourth a period of an oscillation obtained as a characteristic and also turn on with the same timing.

4. A fuel-injection apparatus comprising; a body having discharge orifices to inject fuel, a needle valve movable in a reciprocating manner in a space in the body to thereby open and close at one end thereof the discharge orifices, a balance chamber in which the needle valve is exposed at its opposite end providing a pressure-exposed surface to bear a fuel pressure to regulate an amount of lift of the needle valve, a fuel path for supplying the fuel pressure into the balance chamber, a fuel-discharge passage for releasing the fuel pressure in the balance chamber, a valve for opening and closing the fuel-discharge passage, and an actuator for operating the valve, wherein the actuator applies an electric potential across terminals of piezoelectric elements by turning on an exciting pulse, superposing a pulse so as to turn off for a minute length of time during which the piezoelectric elements remain substantially strained in dimension, just after the exciting pulse has turned on, to thereby cause strains in dimension for the piezoelectric elements, keeping the resultant strains for a preselected length of time, and thereafter ceasing applying the electric potential by turning off the exciting pulse whereby the piezoelectric elements are released from the strains in dimension.

5. A fuel-injection apparatus as defined in claim 4, wherein a pulse is superposed for a minute length of time during which the piezoelectric elements remain substantially strained in dimension so as to turn off the exciting pulse immediately before the exciting pulse is turned off.

6. A fuel-injection apparatus as defined in claim 4, wherein the pulse superposed for the minute length of time is controlled so as to turn off with a timing less than one-fourth a period of an oscillation obtained as a characteristic and also turn on with the same timing.

7. In a piezoelectric actuator in which an electric potential is applied across terminals of piezoelectric elements by turning on an exciting pulse to cause strains in dimension for the piezoelectric elements, the resultant strains being held for a preselected length of time, and thereafter the application of the electric potential ceases by turning off the exciting pulse whereby the piezoelectric elements are released from the strains in dimension, the improvement wherein, just after the exciting pulse is turned on, a pulse is superposed so as to turn off for a minute length of time; and wherein the pulse superposed for the minute of time is controlled so as to turn off with a timing less than one-fourth a period of an oscillation obtained as a characteristic and also turn on with the same timing.

8. A fuel-injection apparatus comprising; a body having discharge orifices to inject fuel, a needle valve movable in a reciprocating manner in a space in the body to thereby open and close at one end thereof the discharge orifices, a balance chamber in which the needle valve is exposed at its opposite end providing a pressure-exposed surface to bear a fuel pressure to regulate an amount of lift of the needle valve, a fuel path for supplying the fuel pressure into the balance chamber, a fuel-discharge passage for releasing the fuel pressure in the balance chamber, a valve for opening and closing the fuel-discharge passage, and an actuator for operating the valve, wherein the actuator applies an electric potential across terminals of piezoelectric elements by turning on an exciting pulse, superposing a pulse so as to turn off for a minute length of time just after the exciting pulse has turned on, to thereby cause strains in dimension for the piezoelectric elements, keeping the resultant strains for a preselected length of time, and thereafter ceasing applying the electric potential by turning off the exciting pulse whereby the piezoelectric elements are released from the strains in dimension; and wherein the pulse superposed for the minute length of time is controlled so as to turn off with a timing less than one-fourth a period of an oscillation obtained as a characteristic and also turn on with the same timing.

* * * * *